Dec. 12, 1967 S. H. SMITH 3,358,090

PUSHBUTTON CONTROL WITH RETAINING AND DISABLING MEANS

Filed March 11, 1963

4 Sheets-Sheet 1

INVENTOR.
SAMUEL H. SMITH

BY Watts & Fisher

B. D. Watts
ATTORNEY

PUSHBUTTON CONTROL WITH RETAINING AND DISABLING MEANS

Filed March 11, 1963

4 Sheets-Sheet 2

INVENTOR
SAMUEL H. SMITH

BY Watts, Fisher
B. D. Watts
ATTORNEY

PUSHBUTTON CONTROL WITH RETAINING AND DISABLING MEANS
Filed March 11, 1963 4 Sheets-Sheet 3
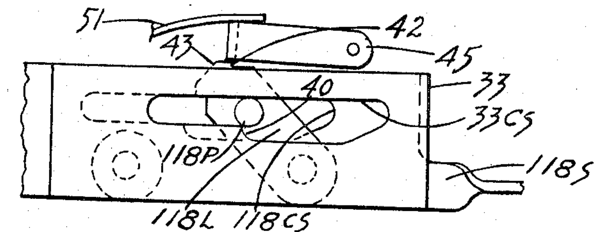
Fig. 8
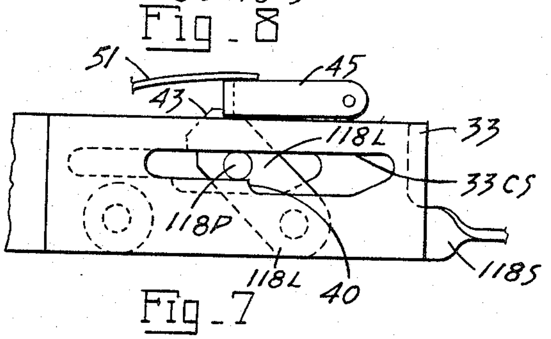
Fig. 7
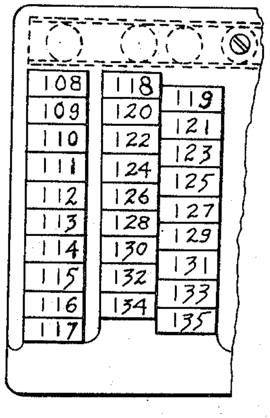
Fig. 11
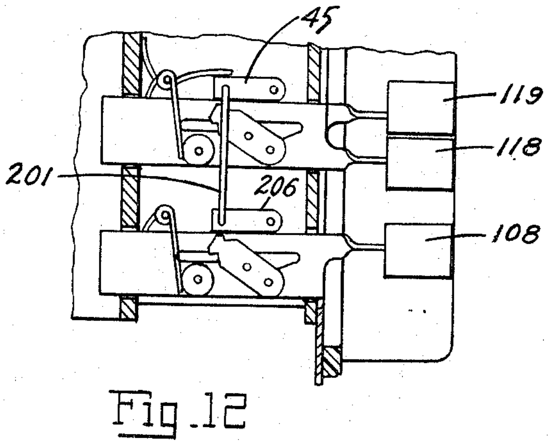
Fig. 12
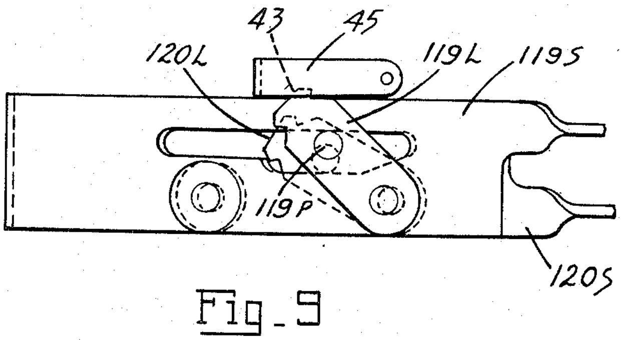
Fig. 9
| Mc. | Control Wire | | | | |
|---|---|---|---|---|---|
| | Ca | Cb | Cc | Cd | Ce |
| 118 | – | – | × | – | × |
| 119 | × | – | – | × | – |
| 120 | × | × | – | – | × |
| 121 | – | × | × | – | – |
| 122 | – | – | × | × | – |
| 123 | – | – | – | × | × |
| 124 | – | – | – | – | × |
| 125 | × | – | – | – | – |
| 126 | – | × | – | – | – |
| 127 | – | – | × | – | – |
| 128 | – | – | – | × | – |
| 129 | × | – | – | – | × |
| 130 | × | × | – | – | – |
| 131 | × | × | × | – | – |
| 132 | × | × | × | × | – |
| 133 | – | × | × | × | × |
| 134 | × | – | × | × | × |
| 135 | – | × | – | × | × |
× = Grounded Connection
Fig. 10
INVENTOR
Samuel H. Smith
BY Watts & Fisher
B. D. Watts
Attorney INVENTOR.
SAMUEL H. SMITH
BY Watts & Fisher
B D Watts
ATTORNEY

3,358,090
PUSHBUTTON CONTROL WITH RETAINING AND DISABLING MEANS

Samuel H. Smith, 31429 Nantucket Row,
Bay Village, Ohio 44140

Filed Mar. 11, 1963, Ser. No. 264,252
21 Claims. (Cl. 200—5)

ABSTRACT OF THE DISCLOSURE

A device including a plurality of slides, each being movable from an idle position to an actuated position, means for retaining a slide in actuated position when moved to that position and disabling means for preventing the retention of more than one in actuated position.

*Background of the invention*

The present invention relates generally to communication equipment and relates more particularly to a control unit for selecting a particular frequency on the communication equipment.

Most present day communication equipment, particularly that used in aircraft, utilize dial type control units for selecting a frequency channel. Such dial type control units generally employ two control knobs each of which is connected to an independent, rotary type switch mechanism and an odometer mechanism or other suitable dial with markings to indicate available frequency settings. The entire dial face is generally covered by a shield having a little window exposing only the frequency setting in use. One of the control knobs and its dial control the whole number megacycle settings, generally from 118.00 through 135.00 megacycles. The second control knob and its dial control the decimal megacycle settings, generally at .05 megacycle intervals from .00 through .95 megacycle. Together, both control knobs provide frequency selection by steps of .05 megacycle from 118.00 through 135.95 megacycles which is the presently used band of communication frequencies. These megacycle settings are often further indicated by a detent coacting with notches in the rotary switch mechanism so that the operator can sense the dial position and changes in the dial position during frequency selection.

The problem with the prior control units is that they require considerable concentration on the part of the operator in setting up a new frequency on the communication equipment. Under present day flying conditions the operator changes the frequency setting on his aircraft communication equipment as often as six different times during the relatively short period required for take-off and exit from the vicinity of an airport. Obviously, such frequent changes in the frequency setting must be obtained with a minimum of delay and distraction from his other duties incident to operating the aircraft. As a result, the operator often follows a trial and error method of frequency selection by turning each of the control knobs a few notches and then glancing at the dial to see if he is turning it in the proper direction and the proper number of notches. The most experienced of pilots often require three or four tries before they finally select the desired frequency.

*Summary*

The present invention aims to solve the above stated problems of the prior art and achieve that aim by the herein disclosed apparatus which possesses the advantages about to be stated.

The present invention provides a novel pushbutton control unit for use with conventional communication equipment and as a replacement for the dial type control units.

The present control unit is very compact and is easily locatable in the space normally provided for the odometer or dial type control units. The present control unit includes a first group of pushbuttons for the whole megacycle intervals and a second group of pushbuttons for the decimal megacycle intervals. A particular communication frequency is selected by depressing a pushbutton in the first group corresponding to the whole number of megacycle setting and depressing a second button in the second group corresponding to decimal megacycle setting. By displaying all of the possible megacycle settings at the same time and in proper consecutive order or sequence the operator is able to immediately look at the frequency setting he desires and simultaneously press the corresponding pushbuttons to make an instantaneous frequency selection. In time, after the operator has become familiar with the layout of the pushbuttons, he will be able to select certain communication frequencies without even looking at the control unit since the pushbuttons are always in the same location and consecutive order. By arranging the pushbuttons in two groups of whole number and decimal number frequency settings each, it is possible to make the units so that the present pushbutton control unit may be substituted for prior dial control units without any modifications of the communication equipment.

In the present control unit, the two groups of pushbuttons are arranged in a very compact space, smaller than the space previously often required for the dial type of control units. In keeping with such compactness, each of the pushbuttons are much smaller than the average finger. When the operator selects a particular frequency setting, his finger often depresses several pushbuttons. The operating mechanism of the pushbuttons is constructed so that only the pushbutton desired remains depressed, giving the particular frequency setting selected. If the pushbuttons are arranged in vertical columns, it is generally convenient to have the uppermost button remain depressed when the operator releases the buttons. If the buttons are arranged in horizontal rows, either the left-most or the right-most button may remain depressed, depending upon the individual's preference.

Another aspect of the invention involves the compact arrangement of switches operated by the pushbuttons where the control unit is remotely located from the transmitter and/or receiver equipment. Remote control of frequency selection is often accomplished by an autopositioner circuit which is essentially a motor driven mechanism which will position the shaft of the frequency selector in relation ot the position of the selector knob on the remotely located control unit.

In prior remote control equipment, the shaft of the control knob controls a rotary switch which is the equivalent of a group of single-pole, double-throw switches connected by conductors to a similar group of switches located at the transmitter and/or receiver. The connection of the switches and the motor mechanism is such that when the first group of double-throw switches are set in a predetermined arrangement, the motor mechanism is energized to operate the second group of switches until they are in a like arrangement. Turning the control knob to a new frequency setting changes the arrangement of the first group of switches so that the motor mechanism operates the second group of switches until they are in a like arrangement and thereby positions the frequency selector shaft to correspond to the shaft setting of the control knob. Since each pushbutton must operate one or more of the switches in the switch group, the total number of switches required for all the pushbuttons would be prohibitive and would make it impossible to provide a compact control unit. The present invention overcomes this problem by providing a compact switching arrangement requiring only one single-pole, double-throw switch per system conductor for all of the pushbuttons in a single group.

Objects and a fuller understanding of the invention may be had by referring to the following description and claims taken in conjunction with the accompanying drawings in which:

FIGURE 7 is a top, partial view of the present control unit as taken along line 7—7 of FIGURE 2;

FIGURE 8 is a top, partial view similar to FIGURE 7 showing different relative slide positions;

FIGURE 9 is a fragmentary sectional view taken along the line 9—9 of FIGURE 2 and showing the relative positions of two pushbutton slides;

FIGURE 10 is a chart showing the switches positions for the control of FIGURE 1;

FIGURE 11 is a fragmentary, front view of a remote control unit similar to that of FIGURE 1;

FIGURE 12 is a top view of the control unit of FIGURE 11 with portions removed;

Figures 1, 2:
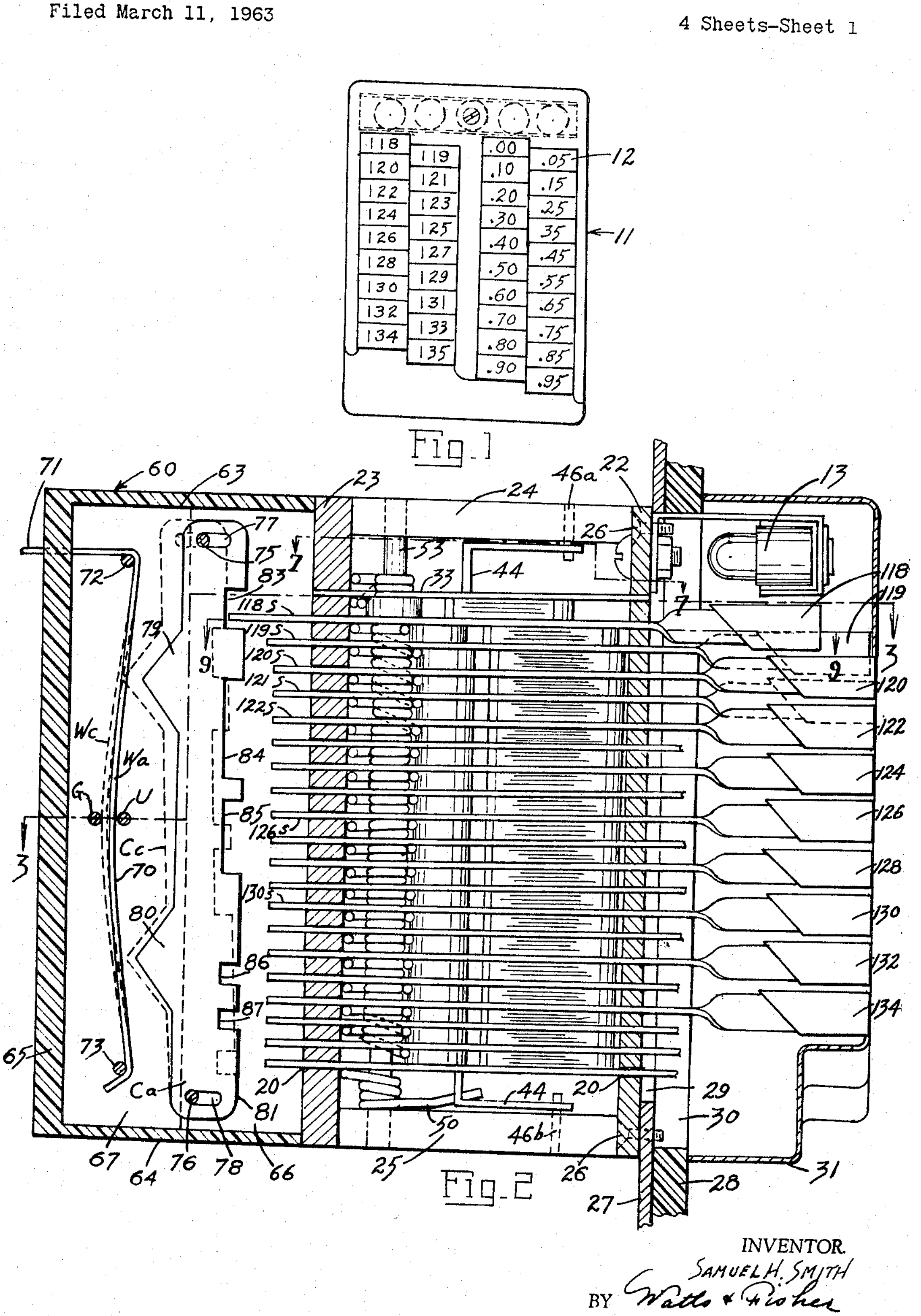
FIGURE 1 is a front view of the pushbutton control unit of the present invention.
FIGURE 2 is an enlarged, side elevational view of the pushbutton control unit of FIGURE 1 as taken along the section line 2—2 in FIGURE 3.

Referring now to the drawings wherein like reference characters indicate like or corresponding parts throughout the several views, a preferred form of the present pushbutton control unit is indicated generally by the reference character 11. As shown in FIGURE 1, the pushbutton control unit 11 includes a plurality of rectangular pushbuttons separated into two groups with the pushbuttons of one group labeled 118 through 135 to indicate whole number megacycle frequency settings and the pushbuttons of the second group labeled .00 through .95 to indicate decimal megacycle frequency settings. A whole number megacycle frequency setting is provided when one pushbutton in the 118–135 pushbutton group and the .00 pushbutton are fully depressed. A communication frequency setting between the whole number megacycle settings is provided when a pushbutton in each of the two groups is fully depressed. For example, the communication frequency 118.15 megacycles is selected by pushing both the 118 and the .15 pushbuttons.

Figures 3, 6:
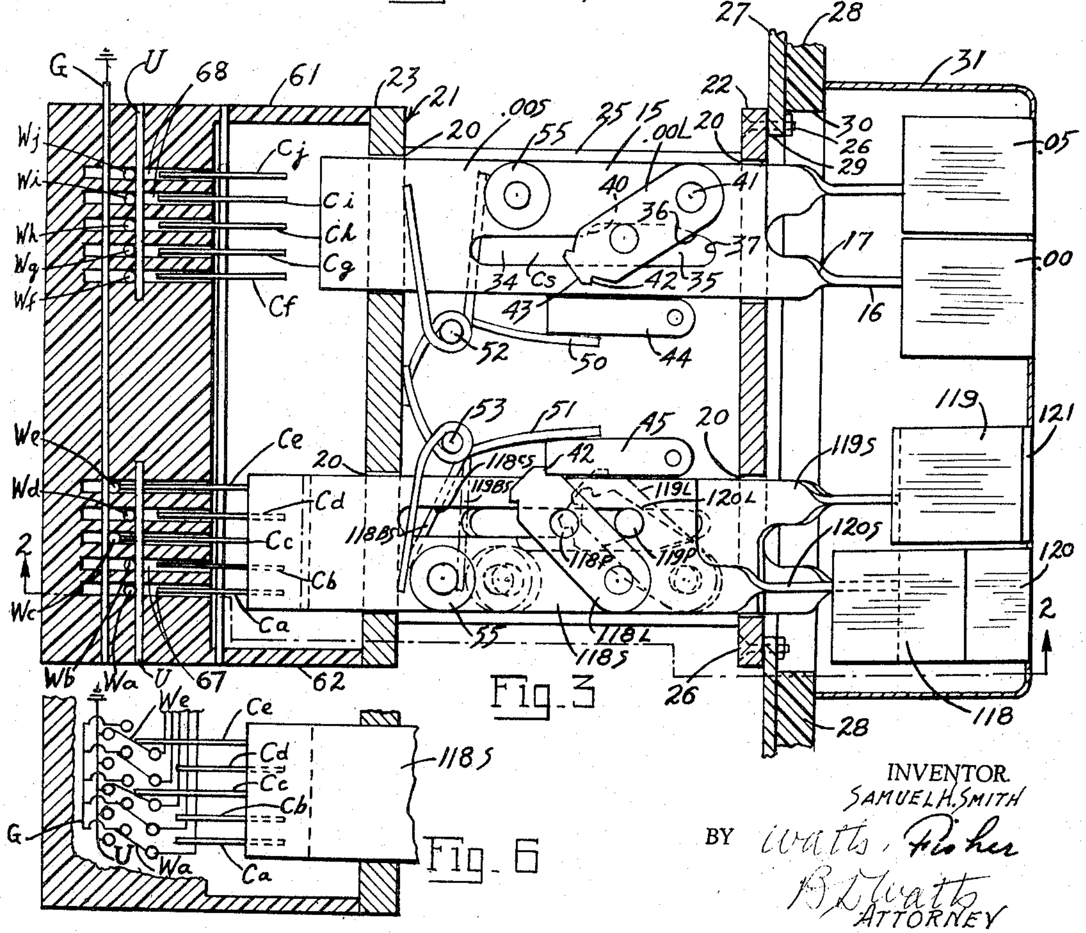
FIGURE 3 is a top view of the control unit of FIGURE 1 with portions removed as indicated by the section line 3—3 in FIGURE 2.
FIGURE 6 is a fragmentary view diagrammatically illustrating the switch positions of the control unit of FIGURE 3.

The pushbuttons 118–135 and .00–.95 are made of a plastic preferably an acrylic resin known by the trademark "Lucite" because of its light conducting properties. The numerals 118–135 and .00–.95 are etched in an opaque substance 12 covering the exposed ends of the pushbuttons. Light from an instrument panel light 13 is carried by the adjacent pushbuttons and causes the numerals to glow against their opaque background. Each of the pushbuttons 118–135 and .00–.95 is connected, as by molding, on the forward end of a metal slide S. Each of the slides S is individually indicated by its corresponding pushbutton number thusly, 118S–135S and .00S–.95S. As best shown in FIGURE 3 by referring to the pushbutton slide .00S, each slide S includes a rectangular planar portion 15, an offset forward portion 16 extending transversely relative to the planar portion 15 and a twisted portion 17 connecting the planar and offset portions 15, 16. The slides S are preferably made of a suitable metal and are slidably mounted in a frame 21.

The frame 21 includes front and back plate members 22, 23 having a plurality of aligned slots 20 to receive the slides 118S–135S, .00S–.95S. The plate members 22, 23 are maintained in a spaced parallel relation by top and bottom connector plate members 24, 25. The frame 21 is mounted, as by fasteners 26, to an instrument panel 27. The instrument panel is partially covered by an outer, edge-lighted "Lucite" panel 28 which provides instrument and indicia lighting. The instrument panel 27 and the "Lucite" panel 28 include openings 29, 30 through which the offset portions 16 of all the slides S protrude. A cover 31 is attached to the front of the instrument and "Lucite" panels 27, 28 to enclose and mask off a space around the pushbuttons 118–135 and .00–.95.

The pushbutton slides S are slidably disposed in the slots 20 in the slotted plate members 22, 23 and are arranged in two groups with the whole number slides 118–135 in a row or column on one side and the decimal slides .00–.95 in a column on the other side. The planar portions 15 of all the slides S in each group are arranged in a spaced parallel relation and in consecutive order. The offset portions 16 of the slides S in each of the two groups are arranged with the even numbered pushbuttons offset to the left and the odd numbered pushbuttons offset to the right when viewed from the front of the control unit 11.

Slotted plates 33 are fixed between the front and rear plates 22, 23 one above each of the uppermost pushbutton slides of each group of pushbuttons. In FIGURE 2 one slotted plate 33 is shown above the slide 118S. Referring again to slide .00S in FIGURE 3, the planar portion 15 of each of the slides S and the slotted plates 33 has an elongated camming slot CS. The camming slot CS includes a narrow rearward portion 34 and an enlarged forward portion 35. One longitudinal edge surface of the enlarged forward portion 35, innermost of the slide S, is defined in part by a tapered surface 36 which terminates at a forward end 37. Such innermost longitudinal edge surface of the enlarged forward portion 35 is also defined in part by a camming surface 40 located approximately intermediate the ends of the camming slot CS. The camming surface 40 connects the longitudinal edge surfaces of the narrow and enlarged slot portions 34, 35 along the innermost longitudinal edge surface of the camming slot CS. The other longitudinal edge surface of the camming slot CS lies outermost of the slide .00S and, as shown, has approximately a straight contour from one end of the camming slot CS to the other.

A latch member L is provided for each of the slides S and is pivotally connected to each slide S by a pivot pin 41. The pivot pin 41 is approximately laterally opposite to the tapered surface 36 of the forward enlarged portion of the camming slot CS. Each latch member L includes a camming pin P which is disposed in the camming slot CS of the slide S above or preceding it. In the case of pushbutton slide 118S the camming pin 118P of its latch member 118L is disposed in the slot 33CS of the slotted plate 33. Each latch member L further includes a notch 42 adjacent its end 43.

Latch bars 44, 45 extend transversely, adjacent each of the groups of pushbutton slides S and coact with the notches 42 in the latch members 118L–135L and .00L–.95L respectively. The latch bars 44, 45 are U-shaped strips having leg portions pivotally connected to the connector plate members 24, 25 by pins *46a, 46b, 47a, 47b*. Each of the latch bars 44, 45 is pivotal from a latching position adjacent a group or bank of slides S to an unlatching or release position away from the bank of slides. Springs 50, 51 carried by pins 52, 53 normally bias the latch bars 44, 45 in their latching positions adjacent their respective bank of slides S. Bias springs BS are also mounted on the pins 52, 53 and engage bosses 55 protruding from the planar portions 15 of each of the slides S and normally bias the slides S in a forward or undepressed position.

When a pushbutton slide S is depressed, the pin P of its latch member L moves longitudinally through the camming slot CS in the above or preceding slide S. This movement may be best understood by referring to FIGURES 3 and 7–9 which illustrate the operation of the pushbutton slide mechanism as pushbutton 118S is depressed. Depression of the pushbutton 118 causes the pin 118P of its latch member 118L to move through the camming slot 33CS of the slotted plate 33 until it engages the camming surface 40 of the camming slot 33CS. At this point the notched end 43 of the latch member 118L engages the under side of the latch bar 45. Further depression of the pushbutton 118 causes its pin 118P to slide along the camming surface 40 thereby causing the latch member 118 to pivot, lifting the latch bar 45 as is shown in FIGURE 8. Still further depression of the pushbutton 118 causes the camming pin 118P to move into the narrow portion of the camming slot 33CS, whereupon the latch bar 45 is urged into the notch 42 by the spring 51 as is shown in FIGURE 7. In the latter, latched position, the bias spring 118BS urges the slide 118S toward its undepressed position and presses the notched end 43 of latch member 118L firmly against the latch bar 45. The latch member 118L, because of its pivoted connection and angle tends to pivot inwardly into the bank of slides but is prevented from doing so by the abutment of the pin 118P against the narrow portion of the camming slot 33CS adjacent its camming surface 40.

All of the slides S with the exception of the first slides 118S and .00S, can be released from a latch position by either raising the appropriate latch bars 44, 45 as by depressing another pushbutton slide, or by moving the camming slot CS in the preceding slide forward so that the camming pin P of the latched slide falls back into the enlarged portion 35 of the camming slot of the preceding slide. The first slides 118S, .00S in each slide group are released only by raising the stop members 44, 45 as by depressing another slide.

Thus, the location of the camming surface 40, intermediate between the ends of the camming slot CS of a particular slide S is such that the camming pin P of the latch member L of a succeeding slide will be in the narrow portion 34 of the camming slot CS of a preceding slide when the latch bar slips or snaps into the notch 42. The intermediate position of the camming surface 40 is also such that any slight forward movement of the camming slot CS of a slide preceding a latched slide permits the camming pin P of the succeeding, latched slide to drop into the enlarged portion 35 of the camming slot CS, thereby unlatching the succeeding slide.

During the final latching movement of the pushbutton slide 118 from the position shown in FIGURE 8 to that shown in FIGURE 7, the forward end 37 of its camming slot 118CS engages the pin 119P to carry the succeeding pushbutton slide 119S slightly rearward in a slightly depressed position as is shown in FIGURE 3. With the pushbutton slide 119S in this slightly depressed position its camming slot 119CS is disposed slightly rearward positioning its camming surface 40 in a release position for the pin 120P of the latch member 120L carried by the still succeeding slide 120S. This relative position of the slides 119S and 120S when the pushbutton slide 118S is fully depressed is illustrated in FIGURE 9. Since the camming surface 40 of the camming slot 119CS is in the release position for pin 120P, the pushbutton slide 120S does not latch if it is depressed along with the pushbutton slide 118S. The pushbutton slide 119S also does not latch if depressed with slide 118S because the camming slot 118CS of the pushbutton slide 118S is fully rearward so that the pin 119P cannot enter the narrow portion 34 of the camming slot 118CS.

This relationship between the selected slide 118S and the succeeding slides 119S, 120S as shown in the drawings is true for any three consecutive slides. In other words, simultaneous depressions of three numerically consecutive pushbutton slides will cause only the first slide to latch and remain in the depressed position. Of course, this relationship is not limited to just three simultaneously depressed slides, but is true for any number of simultaneously depressed slides since any two consecutive slides succeeding a depressed slide cannot latch. Thus, no matter how many pushbuttons the operator depresses, only the first pushbutton in numerical order latches and remains depressed. If he depresses pushbuttons 118–123, only bushbutton 118 latches since the camming slots CS of each preceding is disposed in the release position for the pin P of the latching member L of each succeeding slide.

The front view of the control unit 11 as shown in FIGURE 1 is approximately actual size so that the operator often presses several pushbuttons in making his frequency selection. To facilitate selection of the desired communication frequency the pushbuttons are arranged in a staggered relation such that a pushbutton in one row is adjacent two pushbuttons in the other row. Thus, to make a selection, the operator merely makes sure his finger falls below and misses the pushbutton of the frequency immediately preceding the desired frequency. For example in selecting a frequency of 121 megacycles, the operator can, by sliding his finger down the middle of the two pushbutton rows until the pushbutton 120 is immediately above his finger and then depressing the pushbutton, be assured of obtaining the 121 megacycle communication frequency.

When, as occasionally occurs, the operator depresses only the pushbuttons in a single row, the pushbuttons succeeding the selected button do not latch because the pushbutton slides in the adjacent row are also pulled in slightly placing their camming slots in a release position for the camming pins of the depressed pushbutton slides. For example, the operator in selecting a 120 megacycle frequency setting also depresses pushbuttons 122 and 124 in addition to pushbutton 120. During their final movement to fully depressed positions, even numbered pushbutton slides 120S, 122S, 124S also carry the odd numbered pushbutton slides 121S, 123S, 125S to a slightly depressed position because of the coaction of the ends of the camming slots of the even numbered slides and the camming pins of the odd numbered slides. When the odd numbered slides 121S, 123S, 125S are in such slightly depressed position, they are also in a release position for the succeeding even numbered slides 122S, 124S, 126S because of the previously explained positions of the camming surfaces 40 of the slightly depressed odd numbered slides in relation to the camming pin P of the succeeding even numbered slides.

As was mentioned previously, a latched slide may be released by slightly depressing the preceding pushbutton slide to a release position for the latched slide or by fully depressing any other slide in the same group, as when selecting a new frequency setting. Fully depressing another slide causes its latch member to pivot outwardly of the bank of slides to a position where it engages and raises the latch bar as it passes under it.

As a slide S is depressed, its latch member L, as pivotally connected and set at an angle to the slide S, pivots outwardly of the bank of slides because mainly of the frictional engagement between the latch member and the preceding slide. This tendency of the latch member to outwardly pivot during rearward movement of the slide keeps its camming pin P in abutment with the outwardmost longitudinal surface of the camming slot CS of the preceding slide and its notched end 43 in a position to engage and raise the appropriate latch bar 44 or 45. The angle of the latch member L relative to its slide S is also such that when its notched end 43 engages the latch bar 44 or 45 it will raise the latch bar rather than pivot into the bank of slides. The angle of the end 43 of the latch member L relative to the line of movement of the slide S is also important and is preferably an angle such that the latch bar does not cam the latch member inward of the bank of slides as the slide S is being depressed.

Figure 16:
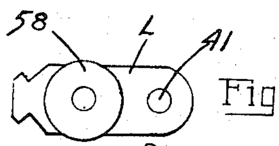
FIGURES 16 and 17 are plan and side views respectively of an alternate assembly of the latch member for the control unit of the present invention.
Figure 17:
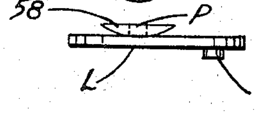

The outermost longitudinal surface of the camming slot thus limits the total possible outward pivotal movement of the latch member L and consequently the angles of the latch member and its notched end 43 relative to the slide S. The total outward exposure of the notched end available for engaging and lifting the latch bar 44 or 45 can, therefore, be adjusted by appropriate positioning of at least portions of the outermost longitudinal surface laterally disposed relative to the latch bar 44 or 45. The position and contour of the longitudinal surface are further definitive of the angles of the latch member L and its notched end 43 and its relative coaction in raising the latch bar 44 or 45. The degree of frictional engagement by the latch member with the preceding slide may be increased by positioning a yieldable, concave friction washer 58 around its camming pin P as is shown in FIGURES 16, 17.

A switch housing 60 is secured to the rear surface of the back slotted plate member 23. The switch housing houses a plurality of single-pole, double-throw switch mechanisms which cooperate with the pushbutton slides S to provide frequency selection by means of an autopositioner positioning system shown in FIGURE 4 and described below. The switch housing 60 includes side walls 61, 62 top and bottom walls 63, 64 and a back wall 65 defining an internal compartment 66 adjacent the rear slotted plate member 23. The back wall 65 is a block of synthetic plastic or other suitable insulating material and includes a plurality of slot-like switch compartments 67, 68 which communicate with the larger, internal compartment 66. The slot-like switch compartments 67, 68 extend transversely to the planes of the slides S and are arranged in two groups. The slots 67 are arranged in a group directly behind the whole number pushbutton slides 118S–135S and the slots 68 are arranged in a second group directly behind the decimal pushbutton slides .00S–.95S.

Switch or control wires *Wa*–*Wj* are provided and switch wires *Wa*–*We*, *Wf*–*Wj* are disposed in the slot-like switch compartments 67, 68, respectively. Each of the control wires *Wa*–*Wj* includes a switching portion 70 extending longitudinally through the switch compartment and a lead portion 71 extending out of the compartment for connection to the autopositioner system. A pair of insulated pins 72, 73 are disposed at the ends of the switching portion 70 and support each of the wires *Wa*–*Wj* within the switch compartments 67, 68. Grounded busbar G and ungrounded busbars U extend longitudinally through the switch compartments 67, 68 and are located on either side of the wires W. The wires W are normally bowed so as to be inherently biased against the ungrounded busbars U to connect the lead portion 71 of the wires W in each group of switch compartments 67, 68 to their respective ungrounded busbars U. The grounded and ungrounded busbars G, U are effectively fixed switch contacts and the wires W are movable switch contacts engageable with either of the busbars G, U to form a single-pole, double-throw switch within each of the switch compartments 67, 68. The single-pole, double-throw switches in the compartments 67 are schematically illustrated in FIGURE 6.

Insulated cam members *Ca*–*Cj* are provided to selectively move the switching portions 70 from their normal positions biased against the ungrounded busbars U to actuating positions against the grounded bars G. The insulated cam members *Ca*–*Cj* are thin, elongated members of insulating material slidably mounted in the entrances of the slot-like switch compartments 67, 68 by pins 75, 76 slidably disposed in cam member slots 77, 78. The cam members C include triangular portions 79, 80 which engage the wires W on either side of the buses G, U. Each of the cam members *Ca*–*Ce*, *Cf*–*Cj* further include a notched longitudinal portion 81 which coacts with the slides 118S–135S, .00S–.95S respectively to provide selective actuation of each of the single-pole, double-throw switches in switch compartments 67, 68 as is required to operate the autopositioner system of FIGURE 4.

The notches in the cam members C are arranged such that full depression of each pushbutton slide S operates only predetermined ones of the cam members C with no two slides operating the exact same cam members. Only those pushbutton slides opposite an unnotched portion of a cam member C can operate that cam member. In FIGURE 2, for example, the cam member *Ca* is notched at 83, 84, 85, 86, 87. Depression of pushbutton 118 causes its slide 118S to enter the notch 83 so that cam member *Ca* is not actuated and does not move the wire *Wa* against the grounded bus G. Cam member *Cc*, on the other hand, is not notched opposite slide 118S and is engaged by the depressed slide 118S to move the switch wire *Wc* away from the ungrounded bus U and against the grounded bus G. Cam member *Ca* is not notched opposite the slides 119S, 120S so that depression of either of the pushbuttons 119, 120 moves cam member *Ca* and actuates switch wire *Wa*.

A schedule of the pushbuttons 118–135 and the cam members *Ca*–*Ce* they operate is set forth in a chart in FIGURE 10. A short line in a box opposite a slide reference number and below a cam member reference character indicates that such cam member is notched opposite that slide. An X in a box opposite one of the slide reference numbers 118–135 and below one or more of the cam member reference characters *Ca*–*Ce* indicates that full depression of the slide will actuate such cam member or members to move the corresponding switch wire or wires against the grounded bus G. For example, the pushbutton slide 118S operates the cam members *Cc*, *Ce*; pushbutton slide 119S operates cam members *Ca*, *Cd*, and so forth, through the entire schedule which shows that every pushbutton slide operates one or more cam members with no two slides operating the same combination of cam members to provide at least eighteen different switching combinations, one for each of the slides 118–135. A similar schedule having twenty different switching combinations is used for the pushbutton slides .00S–.95S. The different combinations of actuated switch wires W for each group of slides are necessary to actuate and control two autopositioner systems, one of which connects the whole number megacycle frequency crystals into the tuning circuit of the communication equipment and the other similarly connects the decimal megacycle frequency crystals.

Frequency selection is made by connecting one or more crystals into the tuning circuit to obtain a desired frequency. Generally there will be a separate crystal for each of the whole number megacycle settings 118–135 megacycles and for each of the decimal megacycle settings .00–.95 megacycles. Each frequency setting from 118.00 megacycles to 135.95 megacycles is obtained by connecting into the tuning circuit both whole number and decimal crystals which blend to provide the desired frequency. A whole number frequency, e.g. 118 megacycles, is obtained by connecting a 118 megacycle crystal and a .00 crystal into the tuning circuit. A communication frequency intermediate between a whole number megacycle setting, e.g. 118.15 megacycles, is obtained by connecting both a 118 megacycle crystal and a .15 megacycle crystal into the tuning circuit. The whole number megacycle crystals and the decimal megacycle crystals are carried on separate drums (not shown) each of which is rotated by the autopositioner systems to selectively connect the desired crystals into the tuning circuit.

Figures 4, 5:
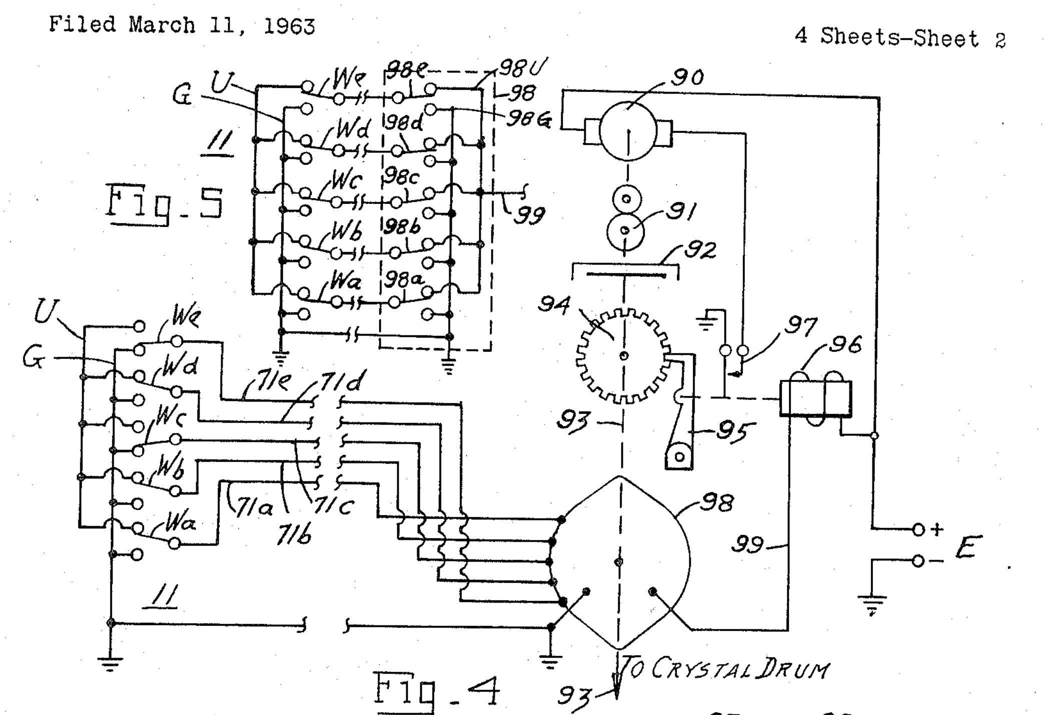
FIGURE 4 is a functional diagram of a remote control electrical apparatus with which the present control unit may be used.
FIGURE 5 is a schematic diagram of a portion of the functional diagram of FIGURE 4.

The two autopositioner systems are identical in principle except for the number of crystal units on their respective drums, and, hence, the number of possible positions for frequency selection. The autopositioner system for the whole number megacycle crystal selection is shown in FIGURES 4, 5. The autopositioner control system is a motor-driven mechanism used to position the shaft of the crystal selector drum to any one of a number of fixed frequency selecting positions as set by the pushbuttons on the remotely located control unit. The autopositioner system includes a motor 90 having its output connected through a gear reduction unit 91 to a slip clutch 92. The output of the slip clutch 92 is connected by a shaft 93 to a notched stop wheel 94, an open circuit seeking switch 98 and a drum of crystals (not shown) which rotates with the shaft 93 for connecting the desired frequency crystal into the tuning circuit. A pawl 95 engages the notches of the stop wheel 94 and a solenoid 96 actuates the pawl 95 and also a set of electrical contacts 97 to start and stop the motor 90. A conductor 99 connects the seeking switch 98 and the solenoid 96 in series with a voltage source E.

The open circuit seeking switch 98 is a rotary, leaf type of switch having leaf-type single-pole, double-throw switches actuated by means of a group of five cams mounted on a rotary shaft, the cams being cut to actuate the switches to a different combination for each shaft position. The switches of the open circuit seeking switch 98 are schematically illustrated in FIGURE 5 as switches **98*a*–98*e* and are shown connected by the lead wires 71*a*–71*e*** to the switch wires W*a*–W*e* of the control unit 11.

The autopositioner control system is of the "open circuit seeking" type which means that whenever the single-pole, double-throw switches in the remote control switch unit 11 and in the seeking switch 98 are not in symmetrical electrical positions, the motor 90 is energized and operates to rotate its shaft 93 and the drum of crystals until the switches are again in a symmetrical relation. When the switches are set symmetrically, e.g., all switch wires W*a*–W*e* engage the ungrounded bus contacts U and all seeking switch movable contacts **98*a*–98*e* engage the ungrounded bus contacts 98U as shown, there is no current connection for the solenoid coil 96 to ground via the conductor 99, and the solenoid 96 and the motor 90** remain deenergized. If the control wire switches W*a*–W*e* are set to a position opposite to that of the corresponding seeking switch contacts **98*a*–98*e*** as by moving one or more of the switch wires W*a*–W*e* from the ungrounded bus contact U to the grounded bus contact G, the conductor 99 is connected to ground to close the series circuit thereby energizing the solenoid 96. The solenoid 96 then lifts the pawl 95 out of the stop wheel notch and closes the motor control contacts 97. The motor starts and drives the autopositioner shaft 93 and the rotor of the seeking switch 98. The motor continues to drive the rotor of the open circuit seeking switch 98 causing its switch contacts **98*a*–98*e* to move through their various switching positions until the switches 98*a*–98*e*** correspond exactly to the positions of the switch wires W*a*–W*e*. When this happens the conductor 99 is no longer connected to the ground, thus opening the energizing circuit for the solenoid 96 which permits the pawl 95 to drop into the corresponding stop-wheel notch to stop the rotation of the shaft 93. The motor control contacts 97 open and the motor 90 coasts to a stop, dissipating its kinetic energy in the slip clutch 92. The seeking switch 98 is adjusted to open the solenoid circuit shortly before the stop-wheel 94 reaches the point where the pawl engages the notch in the stop wheel. Also, the solenoid contacts 97 are mechanically operated by the pawl 95 so that they do not open until the pawl has dropped into the notch. To illustrate the operation of the autopositioner system, assume a 118.00 megacycle frequency is to be selected. If previous to selection the autopositioner system is at rest and none of the pushbuttons 118–135 are in a depressed and latched position, then the switches of the control unit 11 and the seeking switch will be in the positions shown in FIGURE 5. If the pushbutton 118 is then depressed and latched as shown in FIGURE 3, then the switch wires W*c*, W*e* are moved against the grounded bus G as is schematically illustrated in FIGURES 4, 6. The switch wires W*c*, W*e* both connect the conductor 99 to ground thereby energizing the solenoid 96 and, consequently, the motor rotates the shaft 93. As the shaft 93 rotates, the seeking switches **98*a*–98*e* run through their various possible combinations, until the switches 98*c*, 98*e* engage the grounded bus 98G at the time the remaining switches 98*a*, 98*b*, 98*d* engage the ungrounded bus 98U to disconnect the conductor 99 from ground. The solenoid 96 is deenergized to stop the motor 90 and rotation of the shaft 93** at the point where the crystal selector drum has connected the 118 megacycle crystal into the tuning circuit.

The total number of different switch positions possible in the control system illustrated in FIGURE 5 is $2^n-1$, where $n$ is the number of wire switches W used. In the five wire system shown there are 31 possible different switch positions. Thus, the remote control unit 11 can be used to select at least 31 different frequency positions by means of the crystal selector for either the whole number megacycle settings or the decimal megacycle settings. Since there are two such autopositioner systems, one for the whole number megacycle settings 118–135 megacycles, and a second for the decimal megacycle settings .00–.95 megacycles, then it is possible to select any communication frequency from 118.00 through 135.95 megacycles at .05 megacycle intervals.

FIGURE 11 illustrates the front of an alternate form of the control unit 11 having the pushbuttons for selecting the whole number frequencies 108–117 megacycles set apart from the communication frequencies 118–135 megacycles. The frequencies of 108.00 through 117.95 megacycles are the present principal navigation frequencies for instrument landings and Omni-Range navigation purposes. Thus, they are used extremely often and setting them apart from the other communication frequency pushbuttons greatly facilitates the operator's task of frequency channel selection.

The construction and operation of the pushbutton slides 108–117 is similar to that of a pushbutton slide 118–135 as was previously described. In this form of the invention, however, a connector rod 201 connects the latch bar 206 of the bank of slides 108S–117S to the latch bar 45 of the bank of slides 118S–135S as is shown in FIGURE 12. With this interconnection between the latching bar 206 and the latching bar 45, depression of a pushbutton in one bank of slides releases the depressed and latched slides in both banks.

Figure 13:
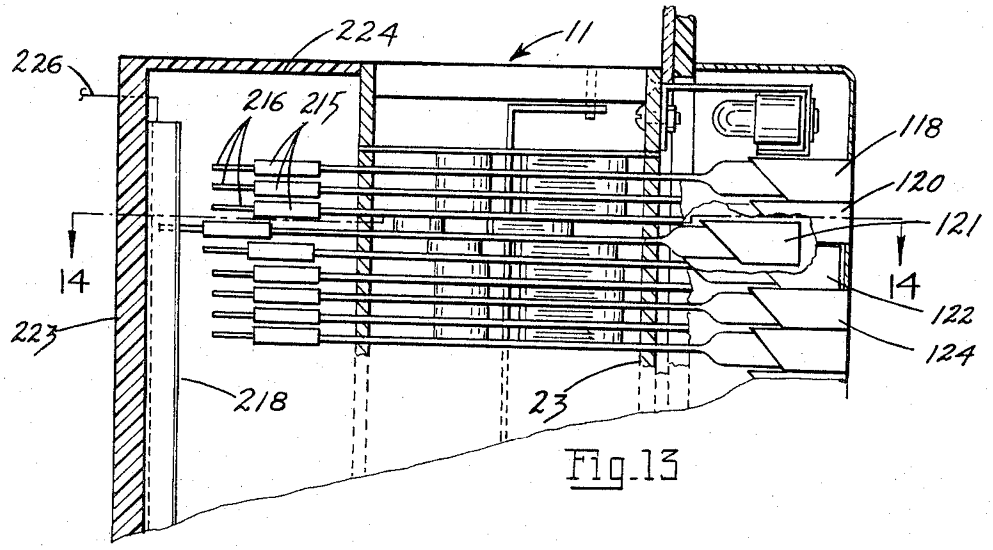
FIGURE 13 is a side elevational view with portions removed of another form of the control unit of the present invention.
Figure 15:
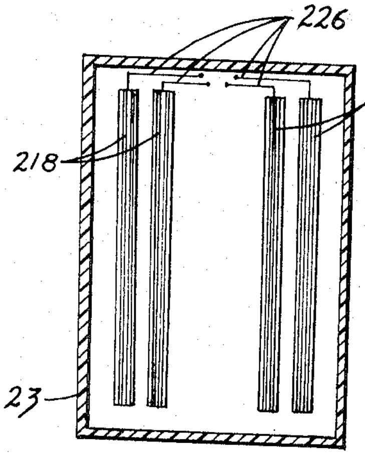
FIGURE 15 is a section view taken along the line 15—15 of FIGURE 14.
Figure 14:
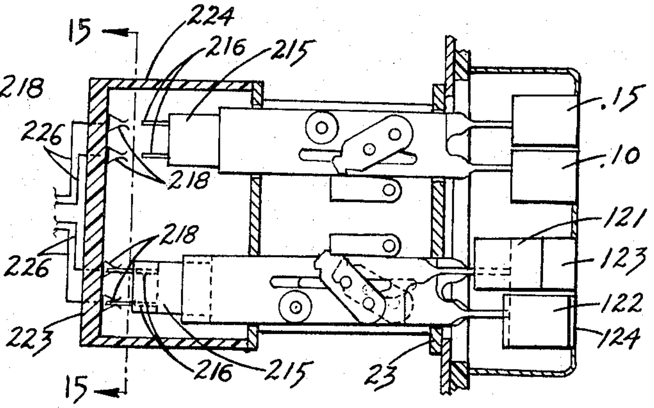
FIGURE 14 is a reduced sectional view taken along line 14—14 of FIGURE 13.

FIGURES 13–15 illustrate another form of the control unit of the present invention wherein crystal selection is performed directly by the control unit 11 rather than remotely through an autopositioner system. This form of the control unit 11 is used quite advantageously where the control unit and the communication equipment share the same chassis which is directly mounted to the instrument panel. As shown in FIGURES 13, 14 a plurality of crystal units 215 are connected to the rearward ends of the pushbutton slides 118S–135S, .00S–.95S.

Each of the crystal units 215 includes prong type of contacts 216 which engage contact socket strips 218 when moved rearwardly by its respective pushbutton slide. The contact socket strips 218 are mounted on the front surface of a rear wall 223 of a switch housing 224 secured to the rear surface of the slotted plate member 23. Conductors 226 connect the contact socket strips 218 to the tuning circuit of the communication equipment. Each of the crystal units 215 are rated to provide the frequency indicated on their respective pushbuttons when the crystal unit is connected into the tuning circuit. In FIGURE 13, for example, the pushbutton 121 is shown as depressed and latched and its crystal unit 215 tunes the communication equipment to a 121 megacycle frequency channel when the crystal unit for the .00 pushbutton is also depressed and latched.

In summary, the present invention may be briefly described as essentially a control unit for multi-channel frequency selection at decimal intervals wherein the control unit includes a plurality of selecting buttons for selecting different frequencies and means which permits only one of a plurality of pressed buttons to select its frequency. The present invention further contemplates a compact switching mechanism cooperating with the selecting buttons to provide remote control of the frequency selecting equipment. Finally, the present invention contemplates that the control unit itself carries frequency selecting crystals so that depression of a pushbutton directly connects the appropriate crystal into a tuning circuit.

Although the invention has been described in its preferred form with a certain degree of particularity, it is understood that the present dislosure of the preferred form has been made only by way of example and that numeous changes in the details of construction and the combination and arrangement of parts may be resorted to without departing from the spirit and the scope of the invention as hereinafter claimed.

What is claimed is:

1. A control unit for selecting one of a plurality of positions on communication equipment, said control unit comprising:
(a) a plurality of operator units each selecting a different one of said positions when pressed;
(b) retaining means connected to each of said operator units to retain each operator unit in a selected position when individually pressed; and,
(c) disabling means connected to said retaining means to prevent all but one of said operator units being retained in the selected position when several units are collectively pressed.

2. A control unit for selecting one of a plurality of positions on communication equipment, said control unit comprising:
(a) a plurality of operators, each of said operators having an unactivated state when not pressed and an activated state selecting one of said positions when pressed;
(b) retaining means operatively connected to each of said operators, said retaining means having retaining and release conditions for all of said operators, said retaining means in its retaining condition being operative to retain a pressed operator in its activated state, said retaining means in its release condition being inoperative to retain a pressed operator in its activated state so that such operator returns to its unactivated state when not longer pressed; and
(c) disabling means operatively connected to said retaining means and operatively associated with said operators, said disabling means being in a retaining condition for one operator and a release position for all other operators when several operators are pressed collectively.

3. A control unit for selecting one of a plurality of control positions, said control unit comprising:
(a) a plurality of operators each having an actuated position when pressed and an unactuated position when not pressed;
(b) retaining means connected to each of said operators to retain each operator in its actuated position when its pushbutton is individually pressed;
(c) each of said operators selecting a different one of said control positions when retained in the actuated position; and,
(d) disabling means connected to said retaining means to prevent all but one of said operators being retained in its actuated position when several operators are collectively pressed.

4. A control unit for connection to mobile communication equipment and providing frequency selection at closely spaced intervals over the band of communication frequencies; said control unit comprising:
(a) a frame member;
(b) a plurality of pushbutton slide members mounted in said frame member, each of said slide members being slidable in said frame member between first and second slide positions;
(c) means urging said slide members toward said first position;
(d) each of said slide members selecting a specific communication frequency when in said second position;
(e) latching means carried by said slide and frame members to latch a slide member to said frame member when said slide member is in said second position; and,
(f) disabling means carried by said slide members and coacting with said latching means to permit latching of only one slide member of a group of slide members in the second position.

5. The device of claim 4 including, in combination:
(g) a plurality of switches secured to said frame member, each of said switches including an actuator element adjacent each of said slide members; and,
(h) said actuator elements and said slide members including portions cooperating to move predetermined ones of said actuator elements wehn each of said slides are moved to said second position.

6. The device of claim 4 wherein said pushbutton slides are arranged in two groups with the slides in the first group providing whole number frequency selections and the slides in the second group providing a plurality of decimal frequency selections between each of the whole number frequency selections.

7. The device of claim 4 wherein said pushbutton slides are arranged in consecutive order according to the frequency each selects, and said slides include pushbutton portions disposed in offset, adjacent relation with even-numbered frequencies in one row and the odd-numbered frequencies in another row.

8. The device of claim 4 including, in combination:
(g) said frame and slide members being operatively associated in relative nonactuating and actuating positions when said slide members are in said first and second positions respectively;
(h) contact means carried by one of said operatively associated members and a plurality of crystal units carried by the other of said operatively associated members;
(i) one of said plurality of crystal units corresponding to one of slide members;
(j) said crystal units including contacts engageable with said contact means when the slide member to which said one crystal unit corresponds is in said second position to connect said crystal unit to a tuning circuit in the communication equipment.

9. A frequency selector for common chassis mounting with mobile communication equipment, said frequency selector comprising:
(a) a frame mountable on the communication equipment chassis;
(b) a plurality of pushbutton slides movably mounted in said frame, each of said slides pertaining to a specific frequency to be selected and said slides being arranged in the consecutive order of said specific frequencies;
(c) a plurality of crystal units one attached to the end of each slide, each of said crystal units having a specific frequency tuning characteristic corresponding to the pushbutton slide to which it is fixed;

(d) each of said crystal units being movable between first and second positions with the pushbutton slide to which it is fixed;

(e) each of said crystal units including a contact;

(f) contact means carried by said frame and positioned to be engaged by the contacts of the crystal units when said pushbutton slides are in said second position; and, (g) electrical means connecting said contact means to a tuning circuit in the communication equipment.

10. A control unit comprising:

(a) a frame;

(b) a plurality of operator elements mounted in consecutive order in said frame, each of said operator elements being movable between first and second positions relative to said frame;

(c) latch stop means carried by said frame;

(d) latching means carried by each of said operator elements and coactable with said latch stop means to latch said operator elements to said frame when singly moved to said second position; and, (e) means carried by at least each operator element preceding another operator element to render inoperative the latching means of the latter operator element when the preceding operator element is moved towards its second position so that when a plurality of operator elements are simultaneously moved to said second position only the latching means of the first operator element is operative to latch such operator element in said second position.

11. A control unit for selecting one of a plurality of frequencies on communication equipment, comprising:

(a) a control frame;

(b) a plurality of pushbutton slides, each relating to a different one of said plurality of frequencies, being slidably mounted in said frame;

(c) said pushbuttons being arranged in consecutive order and each being movable relative to said frame between an outwardly disposed position and an inwardly disposed position providing selection of its particular frequency;

(d) latching means for each of said slides and releasably connecting a slide to said frame when said slide is singly moved to its inwardly disposed position where its related frequency is selected; and, (e) means carried by at least each of said slides preceding another slide in said consecutive order to prevent the latching means of the latter slide from connecting said latter slide to said frame when said preceding slide is in its inwardly disposed position so that when a plurality of consecutive slides are moved to their inwardly disposed positions only the latching means of the first slide is able to connect said first slide in its inwardly disposed position.

12. A control unit for providing selective actuation of a plurality of controlled elements comprising:

(a) a frame;

(b) a plurality of pushbutton slides mounted in spaced parallel relation in said frame, each of said slides being movable in said frame between a first non-actuating position and a second actuating position;

(c) bias means urging said slides in their nonactuating positions;

(d) latching means carried by at least each slide preceded by another slide;

(e) latch stop means carried by said frame and coactable with each of the latching means to latch its respective slide in the actuating position; and, (f) adjacent slides in preceding and succeeding order having coacting cam means to move the latching means of the succeeding slide into a latched relationship with said latch stop means when the succeeding slide is in its actuating position and the preceding slide is fully in its non-actuating position.

13. A control unit for providing selective actuation of a plurality of controlled elements, comprising:

(a) a frame;

(b) a plurality of pushbutton slides mounted in spaced parallel relation in said frame, each of said slides being movable in said frame between a first non-actuating position and a second actuating position;

(c) bias means urging said slides in their nonactuating positions;

(d) a like plurality of latch members one movably connected to each slide;

(e) latch stop means carried by said frame; each of said latch members being movable relative to its associated slide to a latching relationship with said latch stop means to retain said associated slide in an actuating position against the urging of said bias means;

(f) each slide preceding a succeeding slide and the latch member of the succeeding slide including coacting cam means to move the latch member into said latching relationship with said latch stop means only when said latter slide is in its actuating position and the preceding slide is in its nonactuating position.

14. The device of claim 13, wherein said cam means includes a pin on said latch member coacting with a slot on said preceding slide.

15. A control unit for providing selective actuation of a plurality of controlled elements, comprising:

(a) a frame;

(b) a plurality of pushbutton slides mounted in spaced parallel relation in said frame, each of said slides being movable in said frame between a first nonactuating position and a second actuating position;

(c) bias means urging said slides in their nonactuating positions;

(d) a like plurality of latch members one movably connected to each slide;

(e) latch stop means carried by said frame, each of said latch members being movable relative to its associated slide to a latching relationship with said latch stop means to retain said associated slide in an actuating position against the urging of said bias means;

(f) each slide preceding another slide having edges defining a slot extending longitudinally in the direction of movement of said slides, at least one of the longitudinal edges of each of said slots having first and second laterally disposed portions and a camming portion connecting said laterally disposed portions;

(g) each of said latch members including a pin disposed in the slot of the preceding slide and coactable with the longitudinal edge portions of said slot, said pin being disposed adjacent said first laterally disposed edge portion when its associated slide and the preceding slide are both in nonactuating positions, said pin engaging the camming portion of said longitudinal edge and moving its latch member into said latched relationship with said latch stop means when its associated slide is moved toward the actuating position and the preceding slide is in its nonactuating position, said pin engaging said second laterally disposed edge portion to retain said latch member in latched relationship with said latch stop means when the slide associated with the latch member is in the actuating position and the preceding slide is in the nonactuating position so that a slide member is retained in its actuating position against the urging of said bias means only if the preceding slide is in its nonactuating position.

16. The device of claim 15 including, in combination:

(h) said latch stop means including a bar resiliently biased to a position adjacent all of said slides and movable to a release position away from said slides and away from engagement by their latch members;

(i) each said latch member being angularly movable relative to its associated slide and an end portion of the latch member having a notch for engaging said bar in said latching relationship; and, (j) each said latch member moving angularly relative to its associated slide when its pin is moving along the camming edge of the preceding slide in a non-actuating position, the end portion of each said latch member abutting said bar to move it to said release position as its pin is moving along the camming edge to the second laterally disposed edge portion.

17. The device of claim 16, including, in combination:

(k) said latch stop means including a bar resiliently biased to a position adjacent all said slides and movable to a release position away from said slides and away from engagement by their latch members;

(l) each of said latch members being angularly movable relative to its associated slide and an end portion of the latch member having a notch for engaging said bar in said latching relationship; and, (m) each said latch member frictionally engaging the preceding slide so that movement of the slide associated with said latch member causes said latch member to move angularly relative to said slide and disposes the end portion of said latch member in position to engage and move said bar to its release position.

18. A compact switch mechanism comprising:

(a) a frame;

(b) a plurality of push slides mounted in spaced parallel relation in said frame, and movable longitudinally between first and second positions relative to said frame;

(c) a plurality of elongated cam plates slidably mounted in spaced, parallel relation on said frame, said cam plates being disposed vertically relative to said push slides and extending in planes substantially parallel to the line of movement of said push slides so that each of said push slides is in a position to engage a longitudinal edge of each of said cam plates for movement of at least one of said cam plates when such push slide is moved from said first position to said second position; and, (d) a plurality of switches one for each said cam plates, each said switch including a fixed contact attached to said frame and a movable contact operatively engageable by a cam plate for operation between open and closed switch positions with said fixed contact when said cam plate is moved by at least one of said pushbutton slides.

19. The device of claim 18 including, in combination:

(e) each said cam plate having notches in said longitudinal edge opposite predetermined ones of said slides so that no two slides operate the exact same switches.

20. A switch mechanism comprising:

(a) a switch housing having a plurality of parallel compartments;

(b) a like plurality of fixed contact elements one disposed in each of said compartments;

(c) a like plurality of movable contact elements one disposed in each of said compartments, said movable contact elements being movable between engaging and spaced contact positions relative to said fixed contact elements;

(d) a like plurality of cam members one slidably disposed in each of said compartments adjacent the movable contact element therein, said cam members being in spaced parallel relation and each being engageable with the adjacent contact element to move it from at least one contact position to the other;

(e) a plurality of push slide members slidably disposed in said housing adjacent said cam members, each of said slide members being engageable with each of said cam members so that all of said movable contact elements may be operated by any one of said slides, and at least one of said members having portions removed in predetermined locations opposite the other of said members so that no two slides are operable to move the same contacts to the same contact positions.

21. A pushbutton mechanism comprising:

(a) a plurality of slides equipped with pushbuttons arranged in parallel adjacent rows, the pushbuttons of one row being staggered in relation to the pushbuttons of the other row to facilitate accurate depression of a selected pushbutton; each of the slides being movable from an outward noactuating position to an inward actuating position when its pushbutton is pressed;

(b) latch means engageable with each of said slides to retain a slide in actuating position; and (c) disabling means cooperating with said latch means to render the latter inoperative to retain more than one slide in actuating position.

References Cited

UNITED STATES PATENTS

| | | | |
|---|---|---|---|
| 2,338,527 | 1/1944 | Maynard | 310—8.1 |
| 2,479,701 | 8/1949 | Reiss | 334—7 |
| 2,501,003 | 3/1950 | Pifer | 334—7 |
| 2,542,045 | 2/1951 | Minnich | 310—8.1 |
| 2,568,412 | 8/1951 | Robinson | 325—471 |
| 2,649,541 | 8/1953 | McDavitt | 325—25 |
| 2,652,470 | 9/1953 | Batchller | 200—172 |
| 2,855,507 | 10/1958 | Schmidt | 200—172 |
| 2,831,075 | 4/1958 | Dumke et al. | 200—5 X |
| 2,864,957 | 12/1958 | Laschenshi | 325—470 |

FOREIGN PATENTS

| | | |
|---|---|---|
| 575,329 | 2/1946 | Great Britain. |

ROBERT K. SCHAEFER, *Primary Examiner.*

HERMAN KARL SAALBACH, MILTON O. HIRSCHFIELD, *Examiners.*

R. F. HUNT, J. D. MILLER, J. R. SCOTT, *Assistant Examiners.*